United States Patent [19]
Willums

[11] 4,147,454
[45] Apr. 3, 1979

[54] METHOD OF AND APPARATUS FOR CONSTRUCTION OF PIPES FOR MARINE USE, AS FOR OCEAN MINING AND THE LIKE

[75] Inventor: Jan-Olaf Willums, Sandvika, Norway

[73] Assignee: Nor-Am Resources Technology Incorporated, Boston, Mass.

[21] Appl. No.: 625,134

[22] Filed: Oct. 23, 1975

[51] Int. Cl.² ............................. E02F 1/00; B31C 1/00
[52] U.S. Cl. .................................. 405/156; 405/158; 405/165; 37/58; 156/430; 299/9
[58] Field of Search ........................ 61/72.3, 72.2, 107, 61/108, 110; 138/127, 149; 156/430; 37/58; 299/9

[56] References Cited

U.S. PATENT DOCUMENTS

| | | | |
|---|---|---|---|
| 2,605,202 | 7/1952 | Reynolds | 61/72.2 X |
| 3,250,654 | 5/1966 | Rubenstein | 61/72.2 X |
| 3,377,464 | 9/1968 | Rolfes | 138/149 X |
| 3,740,958 | 6/1973 | Cadwell | 61/72.3 |
| 3,768,269 | 10/1973 | Broussard et al. | 61/72.3 |
| 3,924,896 | 12/1975 | Blankenship | 61/72.4 X |

*Primary Examiner*—Jacob Shapiro
*Attorney, Agent, or Firm*—Rines and Rines, Shapiro and Shapiro

[57] ABSTRACT

The present invention is concerned with methods of and apparatus for constructing cylindrical structures such as large-diameter pipes for the transport of materials in ocean mining and the like, whereby one or more rolls of previously prepared sheet materials are wound around a core in a cross-wise fashion and bonded and treated by chemical and physical processes from a special floating platform that enables such construction operation in situ on the high seas.

7 Claims, 4 Drawing Figures

U.S. Patent  Apr. 3, 1979  Sheet 2 of 2  4,147,454
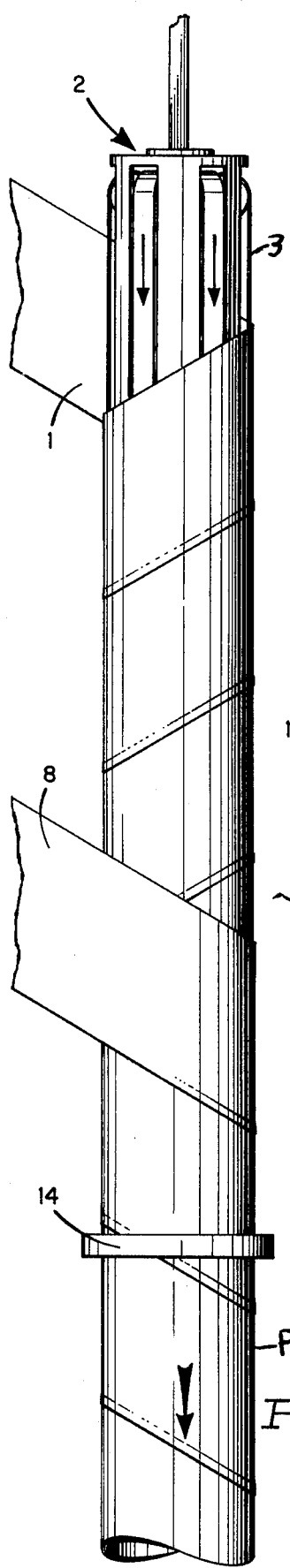
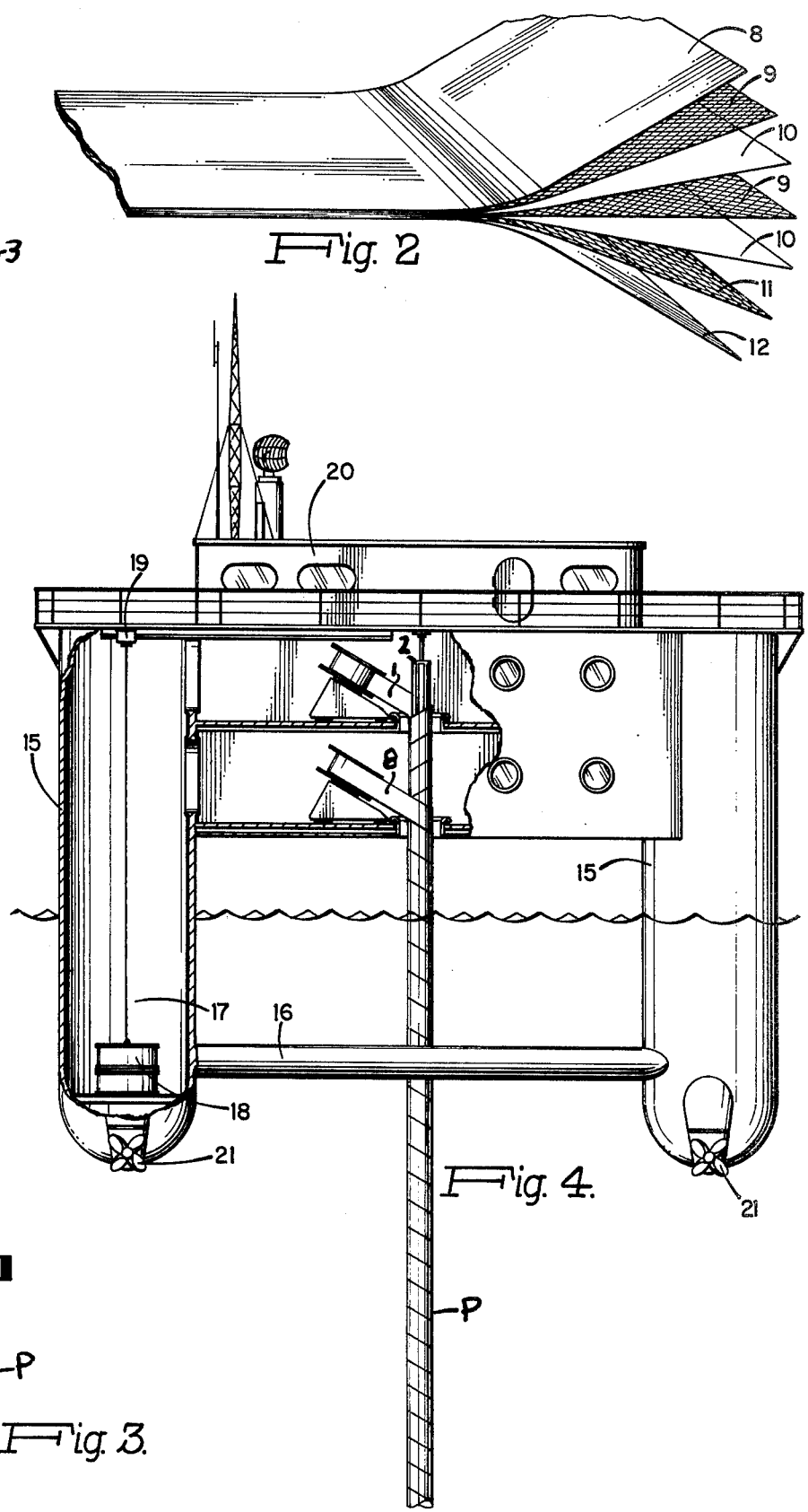

METHOD OF AND APPARATUS FOR CONSTRUCTION OF PIPES FOR MARINE USE, AS FOR OCEAN MINING AND THE LIKE

The present invention relates to methods of and apparatus for constructing cylindrical structures, including tubes and large-diameter pipes and the like, for the transport of materials in ocean mining and similar operations; being more particularly concerned with constructing pipes to be thereupon used in situ for the conveying of fluids in the ocean environment, such as vertically transporting fluid and other materials upwards toward the surface.

Various types of pipes have heretofore been proposed and used over the years in ocean engineering and related work. Several pipes used in offshore petroleum work are described, for example, in *World Oil*, Dec. 1973, p. 50 and p. 60; and July, 1973, pp. 119–121. Pipes for deep-sea mining are mentioned, also, in U.S. Pat. Nos. 3,305,950; 3,522,670; and 3,543,527, as other examples.

These pipes, however, are generally designed in diameters limited to less that two feet or so, and previously have necessarily been made of steel in order to achieve the stress-load capability required. In addition, the joining of such pipe segments has been a difficult and expensive undertaking, especially on the high seas. Bigger diameter pipes have not been available, moreover, in view of the weight and handling problems, such that their application to ocean mining has heretofore been commercially unfeasible.

These serious problems have been admirably overcome, however, by the present invention which, as a primary object, involves providing a new and improved method of constructing pipes and the like for ocean and similar use with a highly favorable displacement ratio well adapted for such ocean work, and adapted, also, for actually forming or constructing the pipe in situ, at sea, thus obviating the size limitation, weight, joining and other difficulties of the prior art.

A further object is to provide a novel pipe and construction method and apparatus of more general applicability, as well.

Other and further objects are hereinafter set forth and are more particularly delineated in the appended claims.

In summary, from one of its aspects, the invention embodies a method of in situ formation of pipe and the like as for the transport of materials within the sea, that comprises, wrapping webs of sheet material in overlapped fashion about a downwardly suspended core to form a tubular pipe, moving the pipe as it is thus formed downwardly off and free of the core in a continuous manner, and continuing the wrapping and moving steps to effect lowering of the freed pipe into the water as it is thus being continuously formed until a desired depth is reached for the usage of the pipe under the water.

The invention will now be described with reference to the accompanying drawing,

FIG. 1 of which is a longitudinal section of a preferred embodiment illustrating the technique of the invention.

FIG. 3 is a fragmentary view of overlapped sheet-pipe formation in the system of FIG. 1;

FIG. 4 is a view similar to FIG. 1 of a platform site mounting for the system; and FIG. 2 is an expanded view of a suitable layer structure for the pipe.

Figure 1:
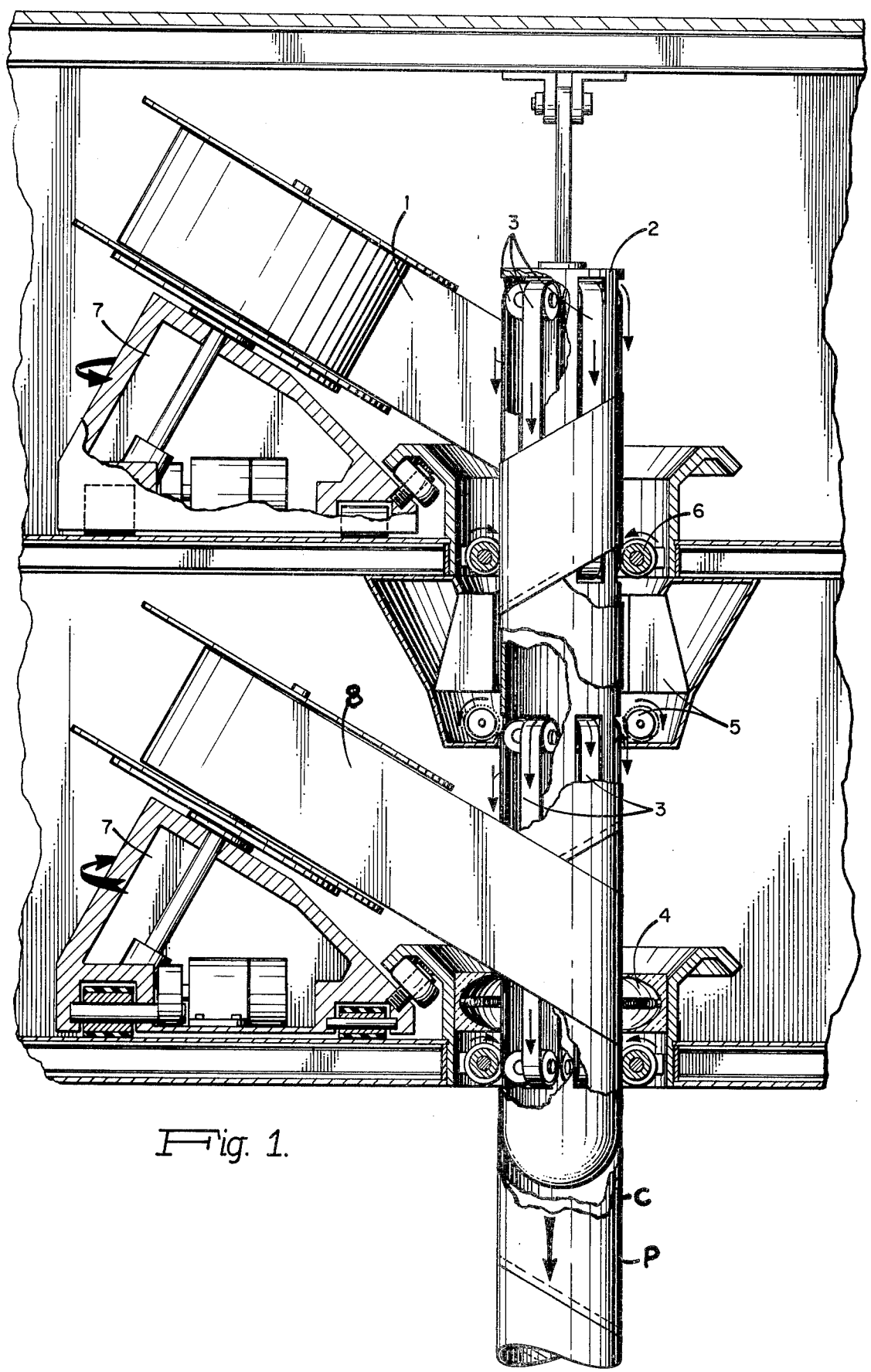

Referring to FIGS. 1, 3 and 4, the novel method of constructing pipe is illustrated as embodying the winding or wrapping of one or more rolls of previously prepared webs of sheet materials or sets of sheets, shown as an upper set 1 and a lower set 8, in a crosswise or overlapping fashion around a core 2 of any desired dimensions, as by coaxially mounted holding members 7 which rotate around the core 2, as indicated. During this process, the overlapping and crossing layers are bound or sealed together by any well-known chemical or physical securing techniques, as later described. The pipe P formed in this manner around the core 2 will be moved down the core by means of belt or similar drives 3, or by other well-known physical means, such as vibrators. During this movement, the physical and/or chemical binding or sealing treatment is applied, as by heat from a heater 4, and/or well-known adhesive material from a spray or coater 5, and with aid of pressure from rollers 6 applied to the pipe, or other well-known binding mechanisms. As the pipe P is formed and is moved downward, it will slip off and be free of the lower end of the core 2, as more particularly shown in FIG. 1, providing a continuous process in which the pipe P as it is formed is lowered in situ into the water to the desired depth.

A suitable overlap sheet web structure 8 for ocean purposes is illustrated in FIG. 2, embodying an outer thin metal, plastic or other protection layer which serves as the outside surface of the pipe and may be treated in conventional fashion so as to prevent damage by marine flora or fauna or the other physical and chemical processes of the sea. One or more metal or other conductive grids 9, insulatingly separated by paper or other dielectric sheets 10, is shown employed to add to the strength of the pipe and to serve as electrical power conductors within and along the pipe P. A further electrical conductor sheet or sheets 11 may also be included, also insulated by paper or other insulation sheets 10 for transmitting message or control information between the bottom of the pipe P and the surface. The inner sheet or web 1, which may be similar to the outer overlapping sheet or web 8, enables reduction in frictional and abrasive problems and other chemical or physical reactions with the fluid and materials pumped upwards or otherwise transported along the pipe P, and may be adhesively coated at 5 to join with the backing layer 12, FIG. 2, of the composite overlapping sheet 8. These sets of layers are sealed or bonded, for instance by epoxy adhesives or the like, as before described, during the overlapping or cross-wise formation of the pipe or tube, as at stations 4, 5 and 6.

In one form of apparatus, rings 14 (FIG. 3) of an appropriately stiff material, such as metal, may be placed inside or outside the pipe P as it drops from the core 2, and bonded by well-known chemical or physical means to the pipe, as before discussed, so that it will increase in strength and prevent collapse or buckling.

Once the continuously formed pipe P has reached the desired depth, as for mining operations, it may be cut at its upper end (as, for example, at region C, FIG. 1) and connected with well-known pumping and other transport system apparatus, as described, for example, in the previously cited publications and patents.

In the aspect of the invention wherein the station for producing pipe is operated in situ on the ocean, this may be effected either from a converted ship or by a specially designed floating platform, as at 20 in FIG. 4. The floating platform 20 is shown comprising several bouyant columns 15, interconnected by transverse beams 16 for added strength. These columns serve also as storage spaces 17 for the supply of materials 18 for the production of the pipe, and at the same time provide the necessary flotation and stability. Cranes 19 may be used to lift or move the rolls of material 18 from the storage compartments 17 to the site of usage at the web-winding station. The actual stations where the pipe P is produced may be enclosed as illustrated so as to allow operation under all kinds of weather conditions. The enclosure may be in the form of living quarters for the crew. The platform 20, furthermore, may be propelled by thrusters 21, well known in the field of platform design. One possible form of such a platform may be triangular, whereby three columns bear the working deck; such a system being easily manouverable.

The pipe, moreover, may also be fabricated at one site in sections of appropriate length and joined together at the mining or other usage location. The invention is, furthermore, not limited to mining operations, but may be used for other purposes, as well, either with or without the sets of insulated conductors where not required, and for other kinds of cylindrical structures, as well. Further modifications will also occur to those skilled in this art and are considered to fall within the spirit and scope of the invention as defined in the appended claims.

What is claimed is:

1. A method of mining materials from within the sea, that comprises forming a pipe in situ on a platform maintained at the surface of the water by wrapping webs of sheet material in overlapped fashion about a downwardly suspended vertical core on the platform to form a vertical tubular pipe, moving the pipe as it is thus formed downwardly off and free of the core in a continuous manner, and continuing the wrapping and moving steps to effect vertical lowering of the freed pipe into the water as it is thus being continuously formed until a desired depth is reached; and then cutting the formed pipe at its upper end, connecting the upper end to a pump and pumping water and mined materials through the vertical pipe at the site of pipe formation.

2. A method as claimed in claim 1 and in which said overlapped wrapping comprises cross-wise winding and sealing together of a plurality of separate sheet webs.

3. A method of mining materials from within the sea, that comprises forming a pipe in situ by wrapping webs of sheet material in overlapped fashion about a downwardly suspended vertical core to form a tubular pipe, at least one of such sheet webs comprising laminated insulated electrically conductive layers, moving the pipe as it is thus formed downwardly off and free of the core in a continuous manner, and continuing the wrapping and moving steps to effect vertical lowering of the freed pipe into the water as it is thus being continuously formed until a desired depth is reached; and then cutting the formed pipe at its upper end, connecting the upper end to a pump and pumping water and mined materials through the pipe.

4. A method as claimed in claim 3 and in which electrical energy is transmitted along and within the conductive layers of the web walls of said pipe.

5. A method as claimed in claim 1 and in which said platform is buoyantly maintained at the surface of the water.

6. A method as claimed in claim 1 and in which stiffening members are attached to the pipe at intervals as it is thus formed and lowered into the water.

7. A method as claimed in claim 5 and in which said pipe is formed at a pipe forming station on said platform and said sheet material is transported from storage-flotation regions of said platform to said pipe forming station.

* * * * *